(12) United States Patent
Janabi et al.

(10) Patent No.: US 12,489,373 B2
(45) Date of Patent: Dec. 2, 2025

(54) SWITCHABLE BIDIRECTIONAL POWER CONVERTER WITH SINGLE POWER FACTOR CORRECTION CIRCUIT AND ON BOARD CHARGER THEREWITH

(71) Applicant: Eaton Intelligent Power Limited, Dublin (IE)

(72) Inventors: Ameer Janabi, West Bloomfield, MI (US); Rohit Baranwal, Oak Park, MI (US); Zhe Zhang, Ann Arbor, MI (US); Devendra Ramesh Patil, Oak Park, MI (US); Guangqi Zhu, Pewaukee, WI (US); Salwan S. Sabry, Sterling Heights, MI (US); Matthew Jones, Waterford, MI (US); Lewei Qian, Novi, MI (US); Saeed J. Siavoshani, Rochester Hills, MI (US); Daniel Robert Ouwenga, Portage, MI (US); Brian Mckay, West Bloomfield, MI (US)

(73) Assignee: Eaton Intelligent Power Limited, Dublin (IE)

( * ) Notice: Subject to any disclaimer, the term of this patent is extended or adjusted under 35 U.S.C. 154(b) by 234 days.

(21) Appl. No.: 18/269,415

(22) PCT Filed: Dec. 23, 2021

(86) PCT No.: PCT/EP2021/025515
§ 371 (c)(1),
(2) Date: Jun. 23, 2023

(87) PCT Pub. No.: WO2022/135744
PCT Pub. Date: Jun. 30, 2022

(65) Prior Publication Data
US 2024/0048058 A1    Feb. 8, 2024

Related U.S. Application Data

(60) Provisional application No. 63/129,982, filed on Dec. 23, 2020.

(51) Int. Cl.
H02M 3/335 (2006.01)
H02M 1/00 (2007.01)
H02M 1/42 (2007.01)

(52) U.S. Cl.
CPC ..... H02M 3/33584 (2013.01); H02M 1/0058 (2021.05); H02M 1/4291 (2021.05); H02M 3/33573 (2021.05)

(58) Field of Classification Search
CPC ......... H02M 3/33584; H02M 3/33573; H02M 1/4291; H02M 1/0058
See application file for complete search history.

(56) References Cited

U.S. PATENT DOCUMENTS 6,545,887 B2 * 4/2003 Smedley ............... H02J 3/1842
 363/47
7,778,045 B2 * 8/2010 Alexander .......... H02M 7/4807
 363/124

(Continued)

FOREIGN PATENT DOCUMENTS

CN 104608591 B * 3/2017 ......... B60H 1/00642
CN 107204707 A 9/2017

(Continued)

OTHER PUBLICATIONS

Machine Translation CN_104608591 (Year: 2017).*

(Continued)

Primary Examiner — Thienvu V Tran
Assistant Examiner — Yahveh Comas Torres
(74) Attorney, Agent, or Firm — Talem IP Law, LLP (57) ABSTRACT

A switchable bidirectional power converter can comprise an interleaved bridge configuration. A multi-phase grid connec- (Continued)

tion to a half-bridge multi-phase switching bank can comprise a first switching half-bridge leg. A single-phase grid connection to a full-bridge single-phase switching bank can comprise the half-bridge multi-phase switching bank interleaved with the full-bridge single-phase switching bank. The full-bridge single-phase switching bank can comprise the first switching half-bridge leg and a second switching half-bridge leg. A capacitor switch can be configured to switch at least two power factor correction capacitors between a parallel connection and a serial connection. The serial connection also includes a center tapping connection to the second switching half-bridge leg. Such a power converter can be used in a bidirectional on-board charger. Ultra-wide range voltages can be handled bidirectionally.

18 Claims, 12 Drawing Sheets

(56) References Cited

U.S. PATENT DOCUMENTS

| | | | |
|---|---|---|---|
| 9,263,960 B2 | 2/2016 | Jovanović et al. | |
| 10,135,350 B2 | 11/2018 | Ye et al. | |
| 11,731,523 B2* | 8/2023 | Pfeilschifter | H02M 1/10 320/109 |
| 11,777,411 B2* | 10/2023 | Baranwal | H02M 3/335 363/21.02 |
| 2002/0149953 A1 | 10/2002 | Smedley | H02J 3/1842 363/84 |
| 2013/0336013 A1 | 12/2013 | Mueller | |
| 2015/0180345 A1 | 6/2015 | Frost | |
| 2015/0280548 A1 | 10/2015 | Shoyama et al. | |
| 2018/0069424 A1* | 3/2018 | Yang | H02J 7/00 |
| 2018/0222333 A1* | 8/2018 | Khaligh | H02M 1/4258 |
| 2019/0202300 A1* | 7/2019 | Pastor | H02J 7/04 |
| 2019/0288539 A1* | 9/2019 | Vela Garcia | H02M 1/4216 |
| 2021/0359594 A1* | 11/2021 | Zhang | H02M 7/219 |
| 2022/0041075 A1* | 2/2022 | Pfeilschifter | H02M 1/007 |
| 2022/0286055 A1* | 9/2022 | Baranwal | H02J 7/06 |

FOREIGN PATENT DOCUMENTS

| | | | | |
|---|---|---|---|---|
| CN | 110474409 A | * | 11/2019 | |
| CN | 210490732 U | | 5/2020 | |
| DE | 102018221519 A1 | | 6/2020 | |
| JP | 2004207095 A | | 7/2004 | |
| JP | 2012105488 A | * | 5/2012 | |
| JP | 2016039663 A | | 3/2016 | |
| WO | WO-2011111058 A2 | * | 9/2011 | H02J 3/1828 |
| WO | 2019199964 A1 | | 10/2019 | |
| WO | 2019208117 A1 | | 10/2019 | |

OTHER PUBLICATIONS

Machine Translation CN_110474409_A_ (Year: 2019).*
Machine Translation JP-2012105488-_ (Year: 2012).*
International Search Report and Written Opinion issued in International Application No. PCT/EP2021/025515, mailed Apr. 4, 2022, 12 pages.
Jovanovic, Milan M., et al., "On-the-Fly Topology-Morphing Control-Efficiency Optimization Method for LLC Resonant Converters Operating in Wide Input-and/or Output-Voltage Range," IEEE Transactions on Power Electronics, Mar. 2016 (accessible Jun. 1, 2015), pp. 1-13, vol. 31, issue 3.
Nguyen, Hoang Vu, et al., "Onboard Battery Chargers for Plug-in Electric Vehicles With Dual Functional Circuit for Low-Voltage Battery Charging and Active Power Decoupling," IEEE Access, Dec. 18, 2018 (Accessible Oct. 18, 2018), pp. 70212-22, vol. 6.

* cited by examiner

SWITCHABLE BIDIRECTIONAL POWER CONVERTER WITH SINGLE POWER FACTOR CORRECTION CIRCUIT AND ON BOARD CHARGER THEREWITH

CROSS-REFERENCE TO RELATED APPLICATIONS

This application is the U.S. National Stage Application of International Application No. PCT/EP2021/025515, filed Dec. 23, 2021, which claims the benefit of U.S. Provisional Patent Application Ser. No. 63/129,982, filed Dec. 23, 2020, which are hereby incorporated by reference in their entirety.

FIELD

This application provides a switchable bidirectional power converter comprising a single switchable power factor correction circuit in an interleaved bridge configuration.

BACKGROUND

The existing on-board charger ("OBC") topologies have a practical challenge in terms of having a design optimized for both single-phase and three-phase grid operation. The voltage variance of the power factor correction ("PFC") between a single-phase connection and a three-phase connection can be up to 400 V. A low voltage load of 24 V can be in a system with a 400 V load. It is challenging to satisfy efficiency, low part count, and the wide range.

SUMMARY

The methods and devices disclosed herein overcome the above disadvantages and improves the art by way of a switchable bidirectional power converter comprising an interleaved bridge configuration. A multi-phase grid connection to a half-bridge multi-phase switching bank can comprise a first switching half-bridge leg. A single-phase grid connection to a full-bridge single-phase switching bank can comprise the half-bridge multi-phase switching bank interleaved with the full-bridge single-phase switching bank. The full-bridge single-phase switching bank can comprise the first switching half-bridge leg and a second switching half-bridge leg. A capacitor switch can be configured to switch at least two power factor correction capacitors between a parallel connection and a serial connection. The parallel connection can be to the single-phase switching bank, the first switching half-bridge leg, and the second switching half-bridge leg. The serial connection can be to the multi-phase switching bank and the first switching half-bridge leg. Such can be used in a bidirectional on-board charger. Ultra-wide range voltages can be handled bidirectionally.

The on-board charger can comprise a first battery connection to the switchable bidirectional power converter and a second battery connection to the switchable bidirectional power converter, wherein the first battery connection is rated for a voltage twice to one or more factor of ten larger than a rating of the second battery connection.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

DETAILED DESCRIPTION

Reference will now be made in detail to the examples which are illustrated in the accompanying drawings. Wherever possible, the same reference numbers will be used throughout the drawings to refer to the same or like parts. The application comprises bidirectional devices for moving power between a grid and a battery. Batteries can be charged from the grid and can power the loads attached to the grid. So, directional references such as "left" and "right" or "input" and "output" are for ease of reference to the figures. For example, the grid on the left can supply voltage to charge the batteries on the right, and the grid can be referenced as a supply-side or input and the batteries can be referred to as being on an output-side. But, the batteries can supply voltage to loads on the grid. Then, the naming can reverse so that the batteries can be referred to as inputs and the grid can be referred to as an output-side or a load-side.

A bidirectional isolated battery charger can be compatible with various grid types and can have an ultra-wide gain range. Instead of stringing together several stages of converters and buck and boost devices, a single power converter topology can be used to provide a wide range of input and output voltages. The topology can step down and can step up voltages between the grid and the batteries. Isolated power conversion can be accomplished. An on-board charger for a two voltage battery system can constitute a single power factor correction circuit as part of a single power converter module.

One enabling feature is the capacitor switch CS1 or CS2. Switches are difficult to add in a customized way in manufacture, so it is important to select a switch placement location that manufacturing equipment can access. Placing the capacitor switch CS1 or CS2 within a switchable bidirectional power converter is therefor not trivial. But, by adding the capacitor switch CS1, CS2 as disclosed, it can be possible to interleave a half-bridge multi-phase switching bank with a full-bridge single-phase switching bank with resulting ability to use one single power factor correction ("PFC") circuit for a very wide range of voltages. Then, an on-board charger of an electric vehicle, for example, can comprise a single switchable PFC circuit instead of a collection of separate converter modules.

With the layouts disclosed, it is possible to switch the load and turns ratio of the power converter disclosed in a single PCF topology instead of multiple converters. Capacitor switches CS1, CS2 can work in tandem with grid-side switches (Supply Switches) $S_{P1}$-$S_{P6}$. Then, a single-phase grid connection represented by $P1_A$ can be made through supply switches $S_{P4}$-$S_{P6}$ while a multi-phase grid connection represented by A, B, C can be made through additional switches or sets of switches. The working examples herein use three-phase grid connections through sets of supply switches $S_{P1}$-$S_{P3}$. Power supply devices such as alternators, motor-generators, regenerative brakes, among others can supply power to the grid connections A, B, C, $P1_A$ while loads such as starter motors, electric vehicle motors, compressors, brakes, accessories, among others, can draw power through the grid connections A, B, C, $P1_A$.

The multi-phase grid connections A, B, C can be connected to a filter such as an EMC (electromagnetic compatibility) filter. Such can include an EMI (electromagnetic interference) filter. Being a high voltage, an LCL is connected to the multi-phase grid connections A, B, C. Other structures can be substituted for the LCL, such as other isolated DC-DC converters known in the art, with mention of a CLLC below.

In electric and hybrid electric vehicles (EVs), the batteries are charged from the grid by an onboard battery charger (OBC). Generally, the batteries in EVs have two usages: one is for powering a high voltage traction motor-inverter system, and a second is low voltage for auxiliary power supplies feeding a load such as lighting, automatic seats, and other electronic devices. The low voltage battery can be charged either from the grid or from the high voltage battery. In FIGS. 1, 3, 5, 7, 9, 11 & 12, the high voltage battery is drawn on the upper left and the low voltage battery is drawn on the lower left. Both batteries can comprise safety switches and passive devices that act with a primary-side passive device. For example, a transformer can be formed with a primary-side winding connected to the switchable bidirectional power converter. A primary-side passive device can comprise at least one inductor, or can comprise at least one inductor and at least one capacitor. As drawn, a transformer can comprise a multi-tap winding of inductance $L_M$. It can be said that the winding of the primary-side transformer is a multi-tap winding. An additional capacitor $C_1$ and inductor $L_1$ are included to form the primary-side passive device. Different numbers of transformer windings can be used. A resonant tank can be an alternative passive device. So, a series inductance in a resonant tank can be in the form of a leakage inductance integrated in a transformer.

Secondary-side passive devices can complete the transfer between the switchable bidirectional power converter and the batteries. Secondary-side windings are shown connected to the batteries with a capacitor $C_2$ and inductor $L_2$ on the high voltage battery and an inductor $L_3$ on the low voltage battery. Connectivity to the batteries can be modulated via switchable devices such as the illustrated MOSFETs $S_1$-$S_4$ & $T_1$-$T_4$. Additional and alternative devices can be included, such as a buck converter, various other capacitors and resistances. Instead of placing bucks and boosts on the switchable bidirectional power converter, these can be placed on the battery-sides of their passive devices. Then, the switchable power factor correction circuit can switch the turns ratio in a single power converter topology.

It can be said that the switchable bidirectional power converter comprises a primary-side transformer comprising a winding parallel to inductor $L_M$ connected with a capacitor $C_1$ and an inductor $L_1$. The primary-side transformer can be connected on a first side to the first switching half-bridge leg LG1 and connected on a second side side to the second switching half-bridge leg LG2. The primary-side transformer is also connected on the second side to the capacitor switch CS1 or CS2 for connecting to a connection between the at least two PFC capacitors CPFC1, CPFC2 and or CPFC3, CPCF4 of the capacitor switch CS1 or CS2.

It can also be said that the switchable bidirectional power converter comprises a primary-side passive power transfer device comprising at least one inductor L1, the primary-side passive power transfer device is connected on a first side to the first switching half-bridge leg LG1 and connected on a second side to the second switching half-bridge leg LG2. The primary-side passive power transfer device is also connected on the second side to the capacitor switch CS1 or CS2 for connecting to a connection between at least two PFC capacitors CPFC1, CPFC2 and or CPFC3, CPCF4 of the capacitor switch CS1, CS2.

OBC topologies have a practical challenge in terms of having a design optimized for both single-phase and three-phase grid operation. The voltage variance of the power factor correction (PFC) between a single-phase connection and a three-phase connection can be, for example, up to 400 V. It can be said that a first battery connection is rated for a voltage twice to one or more factor of ten larger than a rating of a second battery connection. As working examples, a low voltage system can be 12 Volts or 24 Volts, while the high voltage system can be 400 Volts, or 600 or more Volts. One solution to reduce this variance for both grid connections would be boosting the single-phase PFC voltage to the three-phase PFC voltage level. However, this approach renders the OBC inefficient. Given the fact that the PFC can be a boost converter, it is not possible to reduce the three-phase PFC voltage to the single-phase voltage level, either.

Since, resonance converters are mostly used for the DC-DC conversion stage, designing for high input to output gain range can make the magnetic components selection very challenging. Having a large input gain range is related to the two following reasons:

The grid voltage is variable and changes based on operating conditions, and the voltage range between a single-phase grid voltage and a three-phase grid voltage is vast.

The power factor correction (PFC) is a boost converter, and the minimum DC voltage it can produce is always higher than the line-line voltage of the grid.

The onboard battery charger topology herein takes into consideration the consequences of three-phase and single-phase grid connections. This topology uses an H-bridge primary rectifier structure for the CLLC to have the full voltage level in the single-phase case and then switches to a half-bridge CLLC primary rectifier structure in the three-phase case. This splits the PFC DC voltage to a half in the three-phase case allows the CLLC to have the same or very close input voltage for both the three-phase and the single-phase grid connections. So the PFC circuit also functions as a rectifier and inverter as by comprising the features thereof to accomplish the power factor correction.

Figure 1:
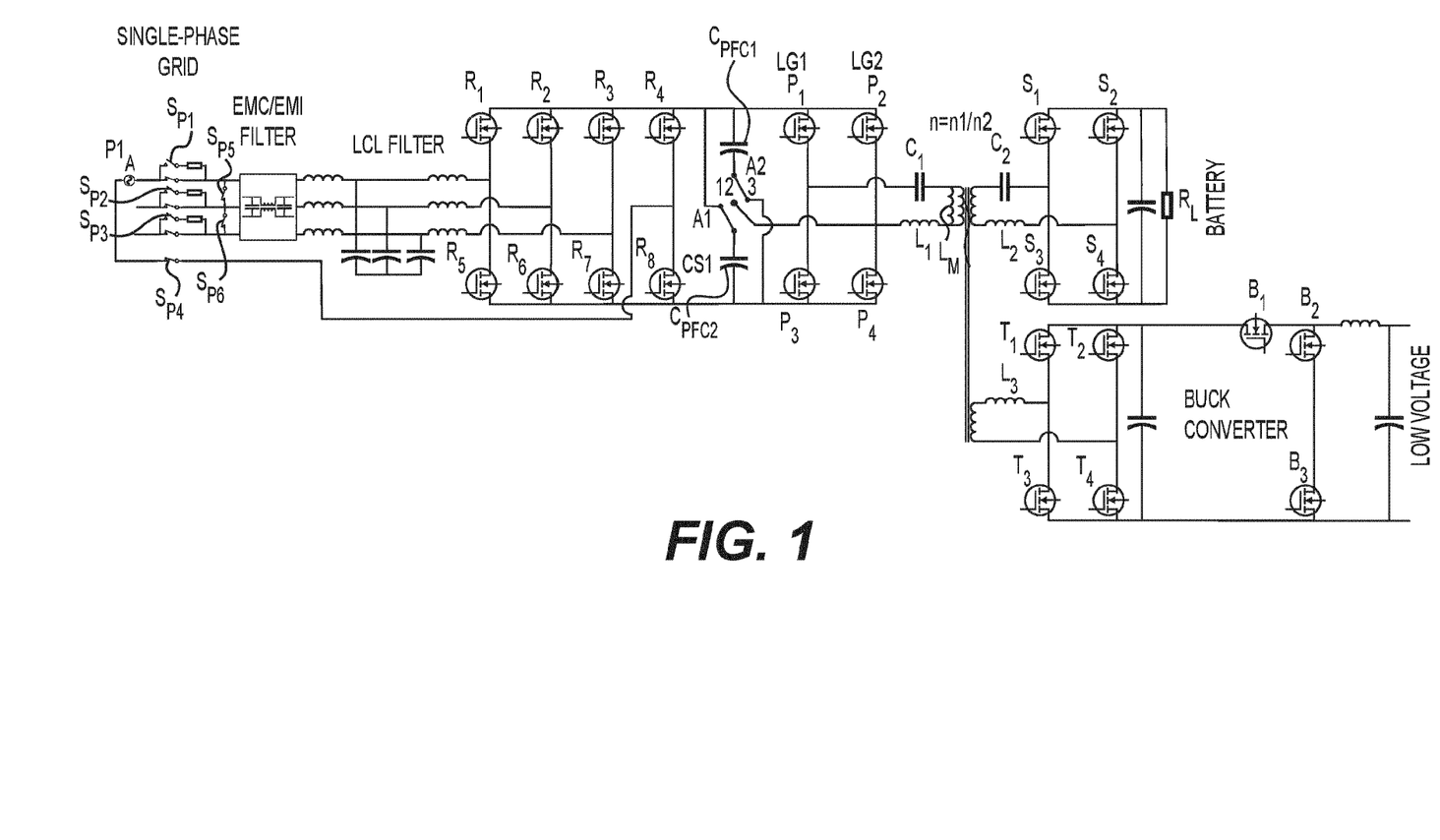
FIG. 1 illustrates an example of a single-phase grid to vehicle battery connection.

FIG. 1 shows a circuit diagram for when the battery is charging from a single-phase grid. The input filter inductors are interleaved, leading to an interleaved single-phase PFC operation. The return path of the single-phase AC source is connected to the fourth PFC leg. The PFC capacitors are rated for the PFC single-phase voltage range (ex.: 350 to 450 V) or another PFC voltage setting (such as 200 V low voltage and 1000V high voltage, or 160 V low voltage and 500 V high voltage). The parallel connection increases the capacitance of the single-phase PFC to filter out the low-frequency component.

Looking to FIG. 1, it can be said that the switchable bidirectional power converter comprises a single-phase grid connection to a full-bridge single-phase switching bank, wherein the half-bridge multi-phase switching bank is interleaved with the full-bridge single-phase switching bank, and wherein the full-bridge single-phase switching bank comprises the first switching half-bridge leg LG1 and a second switching half-bridge leg LG2. The power converter comprises a switchable power factor correction circuit.

The switchable bidirectional power converter can comprise sets of metal-oxide-semiconductor field-effect transistors ("MOSFETS") for switching. Alternatives such as IGBTs can be substituted. The full-bridge single-phase switching bank can comprise MOSFETs $R_4$ & $R_8$ on the grid side of the PFC circuit. A first switching half-bridge leg LG1 can comprise MOSFETs $P_1$, $P_3$ and a second switching half-bridge leg LG2 can be formed by MOSFETs $P_2$, $P_4$ on the battery side of the PFC circuit. For the single-phase connection between the grid and batteries, the capacitor switch CS1 comprises arms A1, A2 and nodes 1-3. Arm A1 connects PFC capacitor $C_{PCF2}$ to node 1 to put PFC capacitor $C_{PCF2}$ in parallel with the full-bridge single-phase switching bank MOSFETs $R_4$ & $R_8$. Arm A2 connects node 3 to PFC capacitor $C_{PCF1}$. An H-bridge type arrangement is made with the first and second half-bridge legs.

Figure 2A:
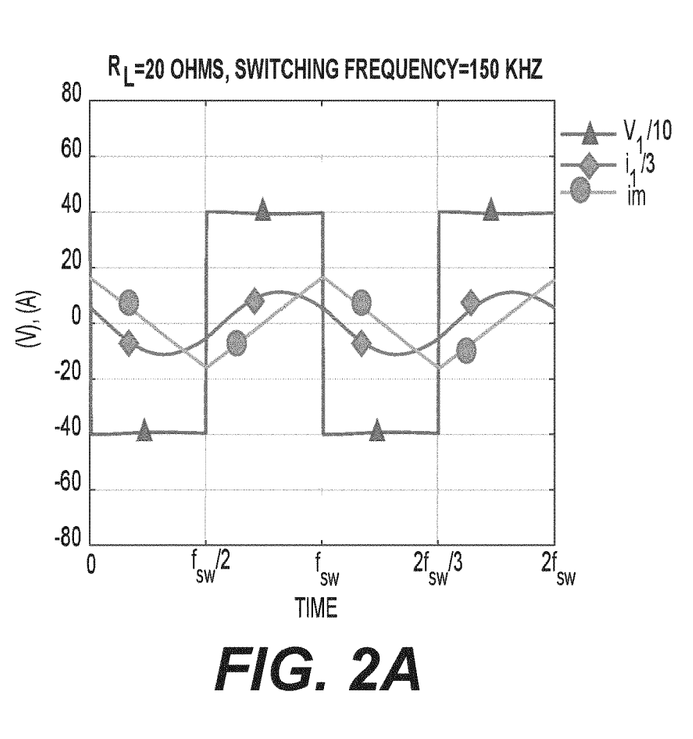
FIGS. 2A & 2B illustrate single-phase grid to vehicle operation.
Figure 2B:
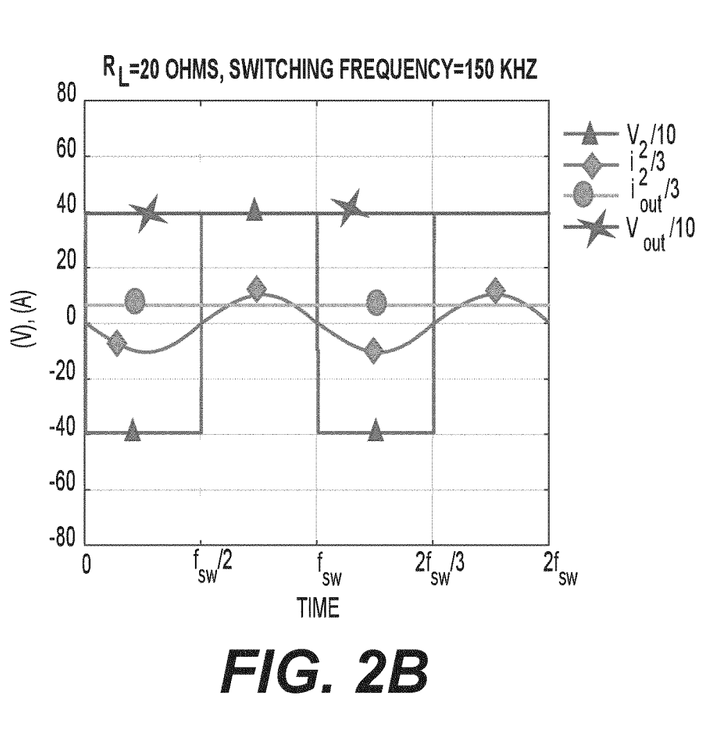

FIGS. 2A & 2B show the voltage (V) and amperage (A) over time for the 20 Ohm resistor $R_L$ placed at the high voltage battery. This is a non-limiting working example of operating frequency control and other options can be implemented. For example, one or a combination of pulse width control with a fixed value for a switching cycle, operating frequency control, or phase shift control can be used. With a switching frequency of 150 KiloHertz, the voltage $V_1$ divided by 10 is shown on a line with triangles, the current $i_1$, $i_2$ divided by 3 is shown on a line with diamonds, $i_m$ and $i_{out}$ divided by 3 is shown on a line with circles, and $v_{out}$ divided by 10 is shown on a line with stars. The notation is repeated for FIGS. 4A, 4B, 6A, 6B, 8A, 8B, 10A & 10B.

Figure 3:
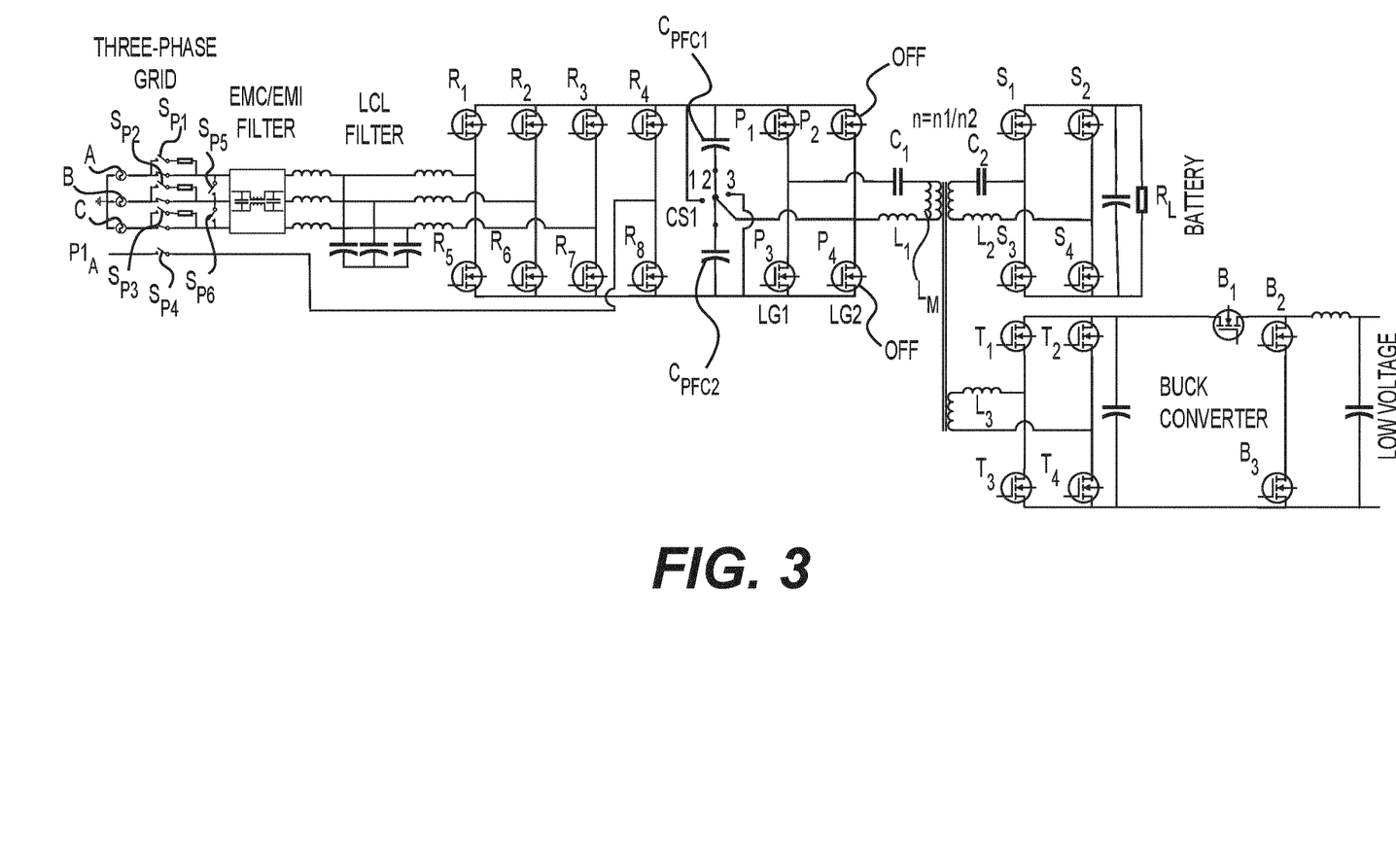
FIG. 3 illustrates an example of a three-phase grid to vehicle battery connection.
Figure 4A:
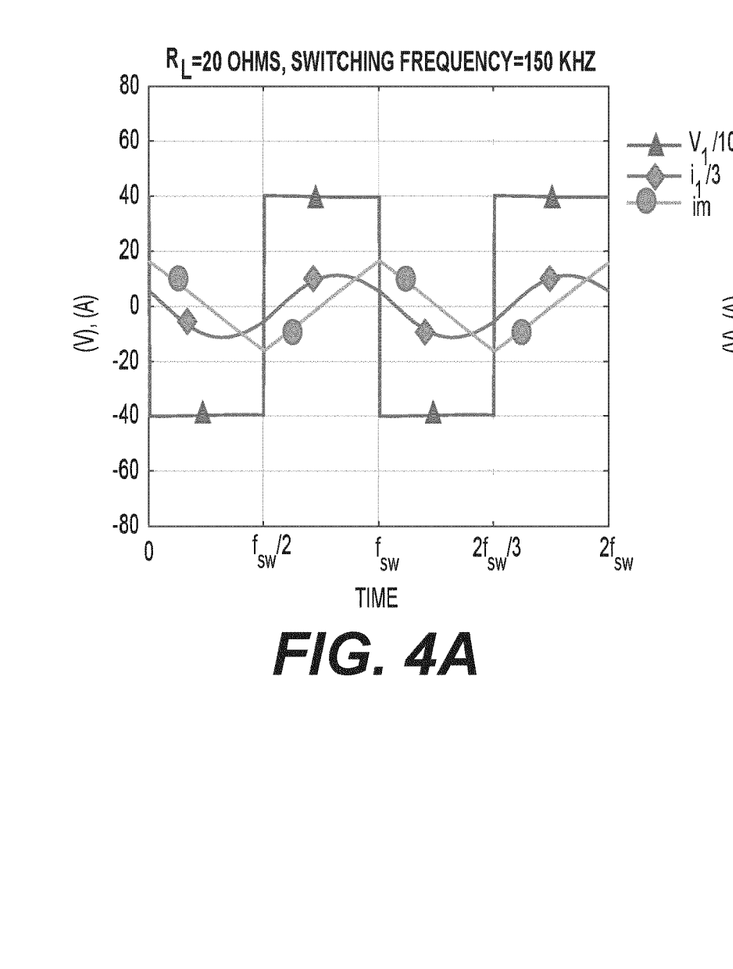
FIGS. 4A & 4B illustrate three-phase grid to vehicle operation.
Figure 4B:
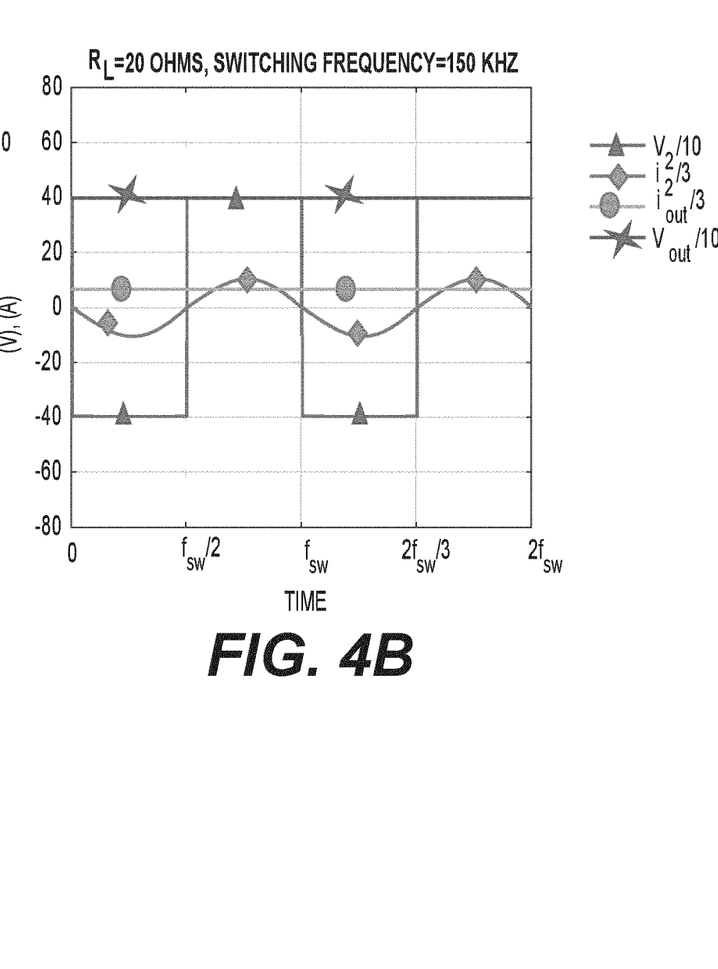

Next, FIG. 3 shows the connection of the three-phase grid to the PCF circuit. FIG. 3 shows the circuit diagram when the battery is charging from a three-phase grid configuration. When the OBC is connected to a three-phase grid, the PFC DC-link voltage almost doubles. Consequently, it is not possible to design a resonant tank or a transformer winding that is optimal for both voltage levels. One approach is to have two separate resonant tanks and two sets of the transformer primary winding (center tapped) to accommodate the two input voltage ranges. But, one can avoid the additional cost associated with this approach. The primary of the CLLC is restructured from full-bridge to a half-bridge. The restructure splits the PFC voltage to a half. This can be done by a single relay structure (capacitor switch CS1) that changes the connection of the DC-link capacitor from parallel to series. Because in the three-phase PFC case, there are no low order harmonics on the DC-link side, a reduction in the value of the PFC capacitors $C_{PCF1}$ & $C_{PCF2}$ can be designed in a way that does not affect the DC-link ripple requirements. The half-bridge structure with the split capacitor arrangement splits the PFC voltage to half of when an H-bridge is used. This leads to a PFC voltage in the same range of the PFC voltage generated from a single-phase grid connection (compare FIGS. 2A & 2B with 4A & 4B). During the use of only a half-bridge, the other half-bridge remains unused.

The second switching half-bridge leg LG2 can be configured to switchably connect to the half-bridge multi-phase switching bank via metal-oxide-semiconductor field-effect transistors ("MOSFETS") $P_2$, $P_4$. That is, these MOSFETS can be controlled to turn off as shown in FIG. 3. This creates a Half-Bridge structure.

It can be said that the switchable bidirectional power converter comprises a multi-phase grid connection to a half-bridge multi-phase switching bank. The half-bridge multi-phase switching bank can comprising the first switching half-bridge leg LG1 formed by the switches, here MOSFETs $P_1$, $P_3$. The multi-phase switching bank can be comprised of switches such as MOSFETs $R_1$-$R_3$ & $R_5$-$R_7$.

The capacitor switch CS1, forming part of a switchable power factor correction circuit, switches both arms A1, A2 to node 2 so that PFC capacitors $C_{PCF1}$ & $C_{PCF2}$ are in series. By connecting to node 2 (and turning OFF switches of LG2), the primary-side passive power transfer device is connected on the first side to the first switching half-bridge leg LG1 and connected on the second side to node 2 of the capacitor switch CS1 to switch from a connection to the second switching half-bridge leg LG2 (FIG. 1) to a connection between the at least two power factor correction capacitors $C_{PCF1}$ & $C_{PCF2}$.

Comparing FIGS. 1 & 3, it can be said that the capacitor switch CS1 is configured to switch at least two power factor correction capacitors (PFC capacitors) $C_{PCF1}$ & $C_{PCF2}$ between:
  a parallel connection to the single-phase switching bank, the first switching half-bridge leg LG1, and the second switching half-bridge leg LG2; and
  a serial connection to the multi-phase switching bank and the first switching half-bridge leg.

Figure 5:
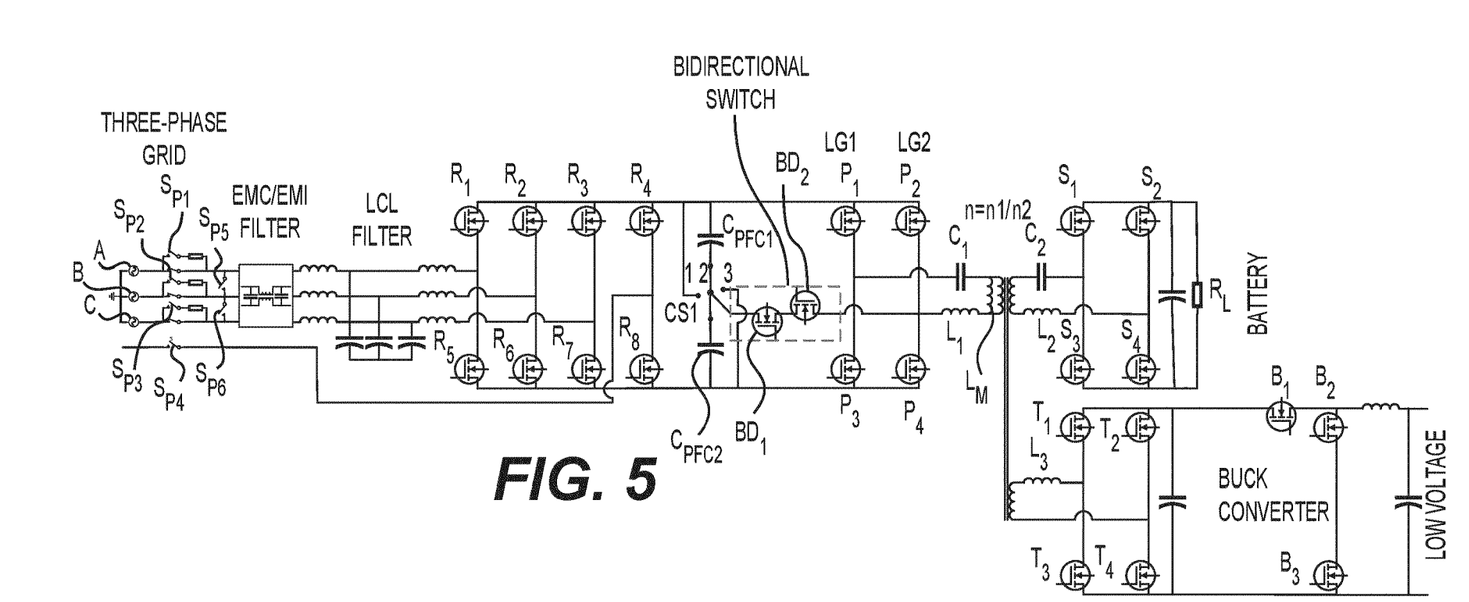
FIG. 5 shows one alternative for retaining both an upper and a lower zero vector.
Figure 5A:
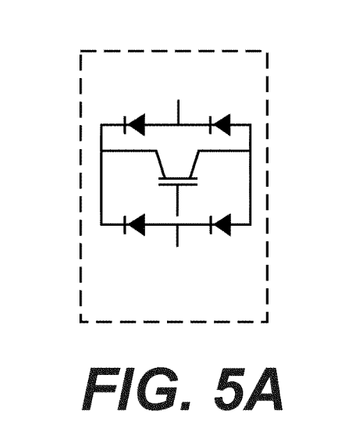
FIGS. 5A-5C show alternative bidirectional switches to substitute in the dashed line box of FIG. 5.
Figure 5B:
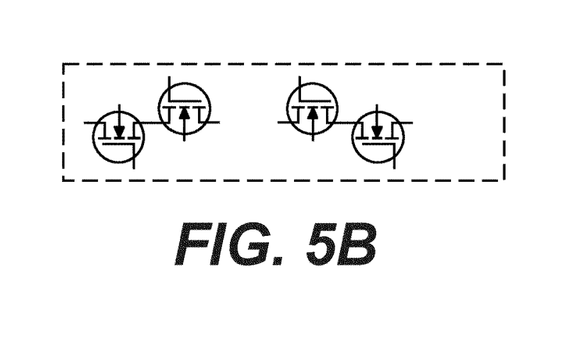
Figure 5C:
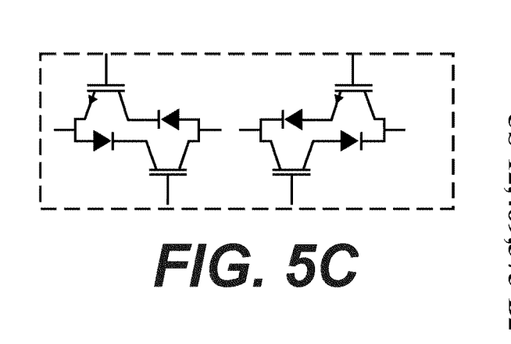
Figure 6A:
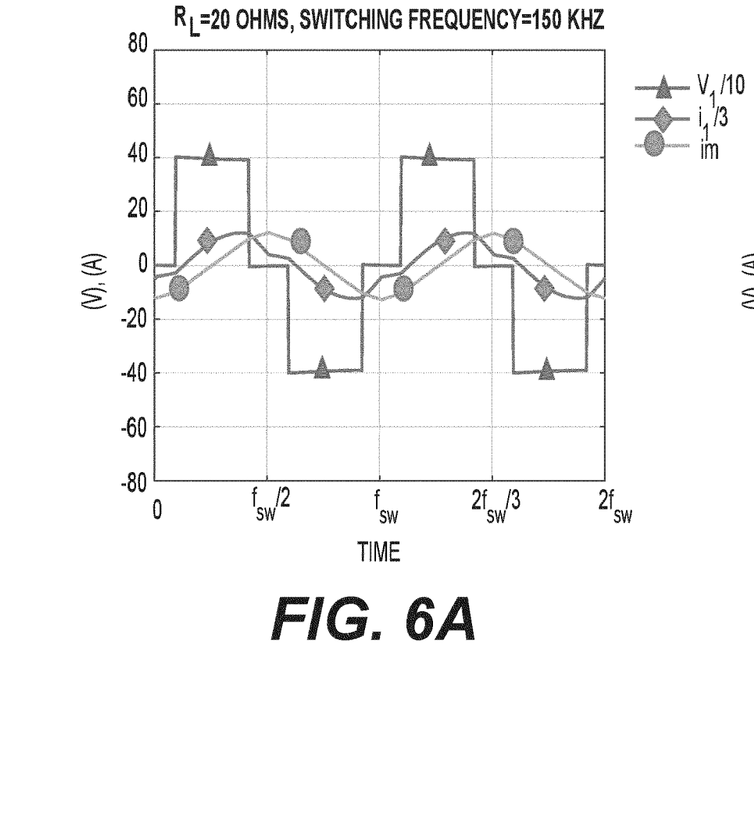
FIGS. 6A & 6B show three-phase grid to vehicle operation with both zero vectors in use.
Figure 6B:
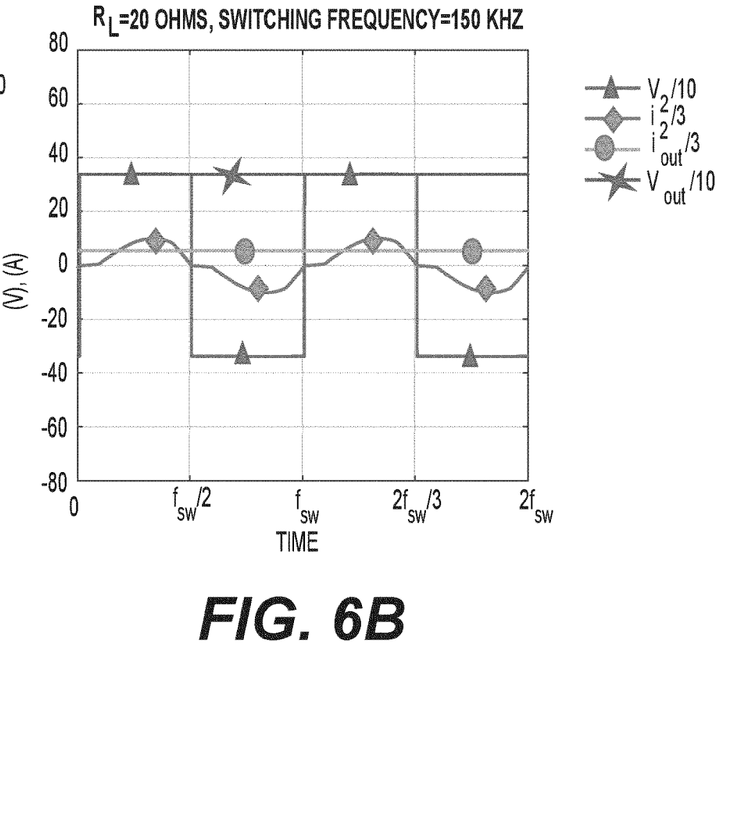

Turning to FIG. 5, it is desired to have the option of retaining one or more zero vectors. During the topology change from the H-bridge to the half-bridge, the voltage that can be generated by the primary of the CLLC is two-level voltage (high and low without the zero vector). In order to retain both the zero vector (high zero vector and the low zero vector), a bidirectional switch, shown as a pair of switches $BD_1$, $BD_2$, can be used to disconnect the neutral connection momentarily while the two legs of the H-bridge are used to generate one of the zero vectors. The circuit diagram is shown in FIG. 5. Alternative examples of bidirectional switches are also shown in FIGS. 5A-5C and can be substituted in FIG. 5, for this matter. The alternatives are non-limiting. FIGS. 6A & 6B contrast with the prior three-phase grid operation with stepped responses in the voltage (V) and amperage (A) over time.

It can be said that the switchable bidirectional power converter can comprise a bidirectional switch, that can comprise a pair of switches $BD_1$, $BD_2$, on the second side of the passive device. The bidirectional switch can be connected between the capacitor switch CS1 and the connection to the second switching half-bridge leg LG2. Then, the switchable bidirectional power converter can be configured to disconnect a neutral line of the multi-phase grid connection while the first switching half-bridge leg LG1 is connected in parallel to the second switching half-bridge leg LG2 to generate a zero vector. The second switching half-bridge leg LG2 can be configured to switchably connect to the half-bridge multi-phase switching bank.

Figure 7:
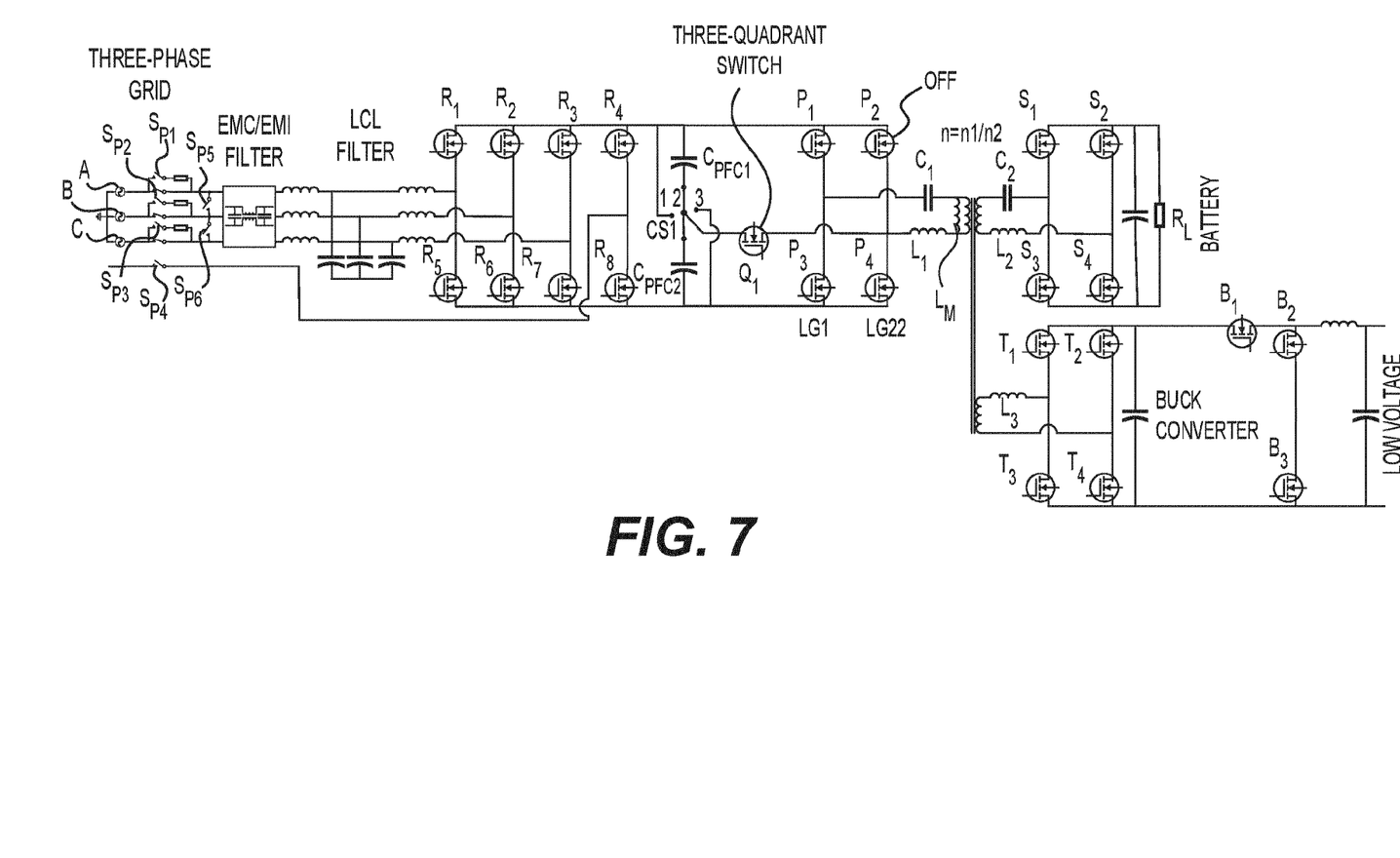
FIG. 7 is an illustration of a circuit retaining only the lower voltage zero vector.
Figure 8A:
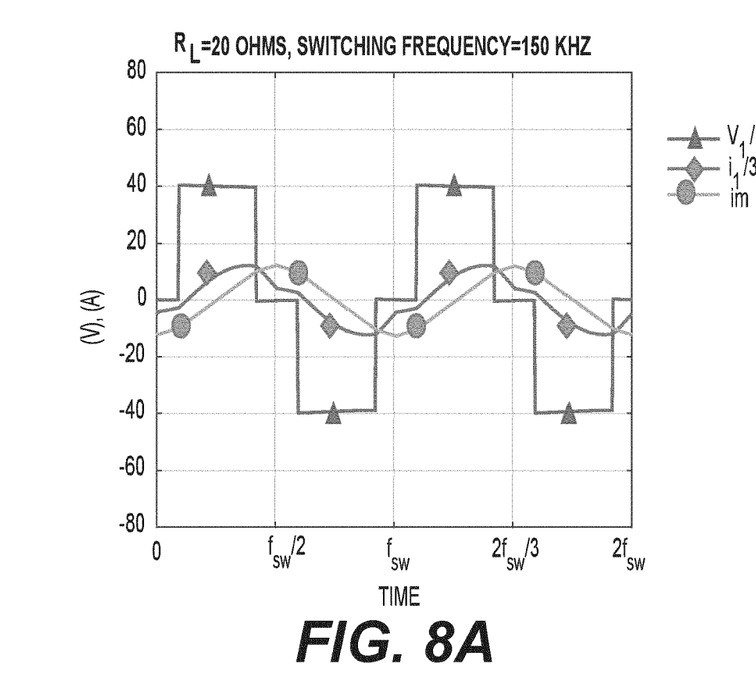
FIGS. 8A & 8B show the three-phase grid to vehicle operation with only the lower zero vector in use.
Figure 8B:
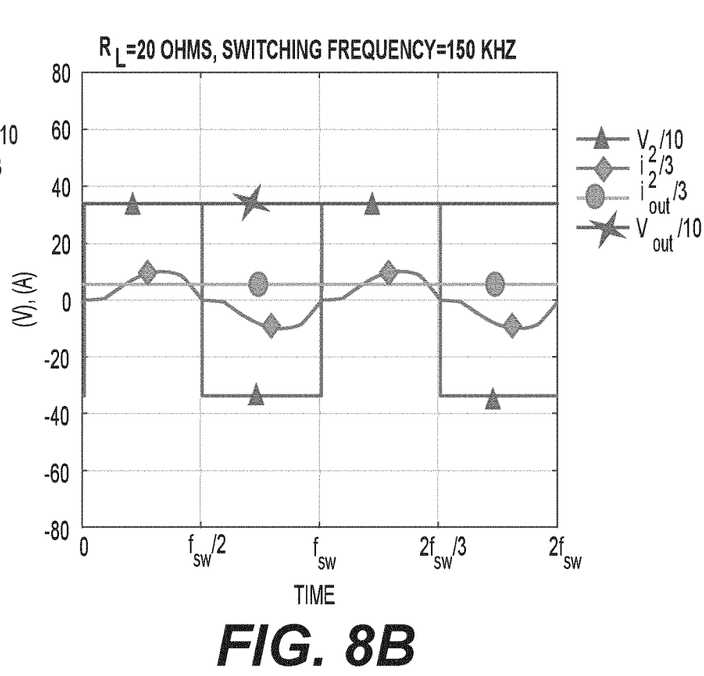
Figure 9:
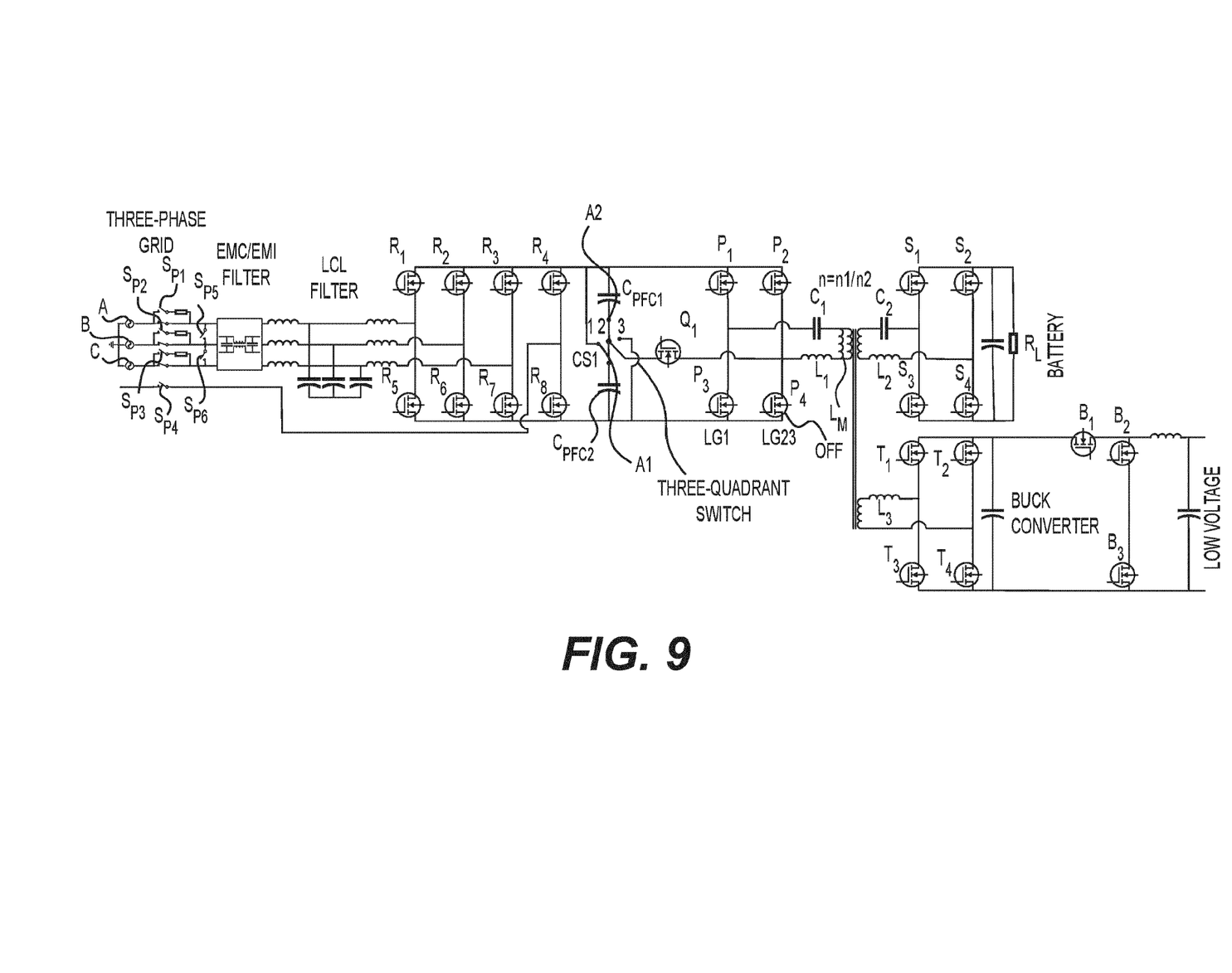
FIG. 9 is an illustration of a circuit retaining only the upper voltage zero vector.
Figure 10A:
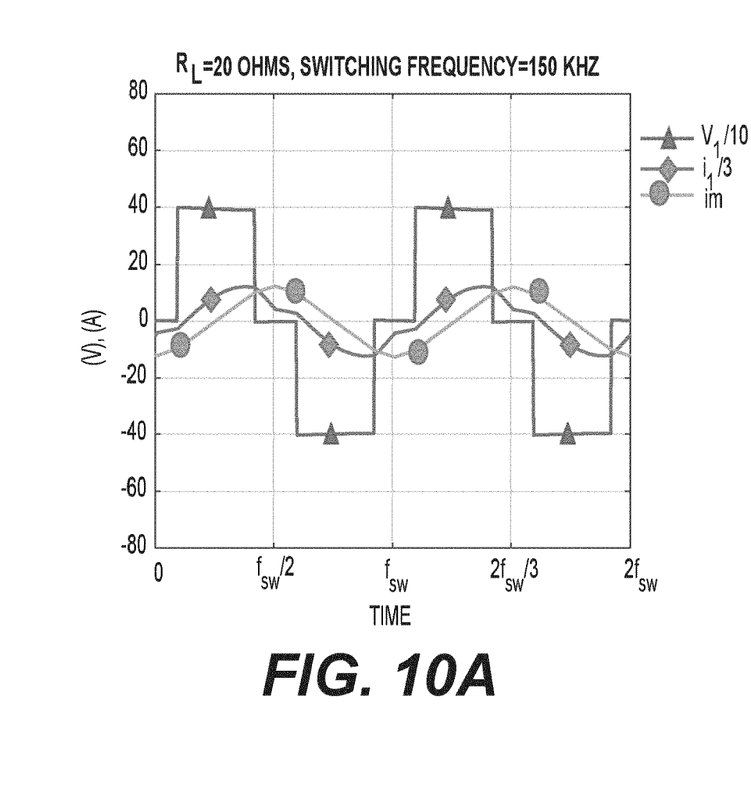
FIGS. 10A & 10B show the three-phase grid to vehicle operation with only the upper zero vector in use.
Figure 10B:
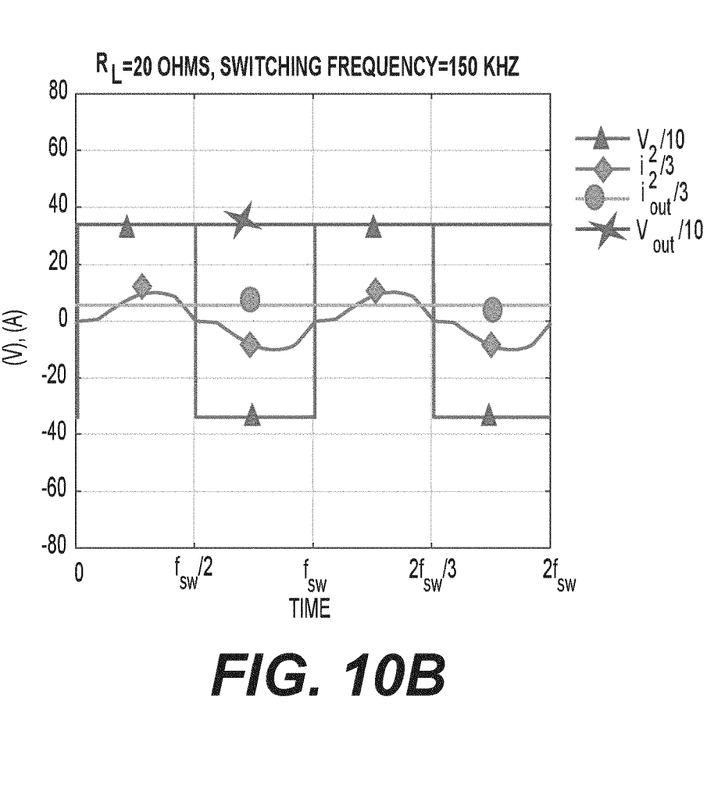

As another option, it can be possible to retain only the lower voltage zero vector. The zero-vector usage can still be done with only one of the zero vectors. To retain the zero-vector generated by the two lower switches of the CLLC primary, the voltage that needs to be blocked is only −Vdc/2. Therefore, a three-quadrant switch $Q_1$ can do the job. Note that if the structure in FIG. 7 is used, the switch corresponding to MOSFET $P_2$ is always OFF for this multi-phase configuration. The MOSFET $P_2$ can be turned off with appropriate controls for the multi-phase operation and turned on for the full bridge single-phase operation. The switchable bidirectional power converter can comprise the three-quadrant switch $Q_1$ on the second side of the passive device and the three-quadrant switch $Q_1$ can be connected between the capacitor switch CS1 and the connection to the second switching half-bridge leg LG22. Similarities between FIGS. 6A, 6B & 8A, 8B can be seen, making the single three-quadrant switch $Q_1$ a viable option to the pairs of bidirectional switches $BD_1$, $BD_2$ shown in FIGS. 5, 5A-5C.

As another option, it can be possible to retain only the upper voltage zero vector. If only the upper zero vector is used, the required blocking voltage is +Vdc/2. Therefore, the structure shown in FIG. 9 can be used to achieve zero vectoring. Note that in this topology, the switch, MOSFET $P_4$, is always OFF in the multi-phase operation. It can be controlled to turn on for the full-bridge single-phase operation. So, controls to the MOSFETs P2, P4 can connect the second switching half-bridge leg LG23 in parallel with the first switching half-bridge leg LG1. Also, as another option, a properly selected snubber capacitor can be connected across the three-quadrant center-tapping switch to avoid noise. Acceptable voltage (V) and amperage (A) over time can be seen in FIGS. 10A & 10B.

Figure 11:
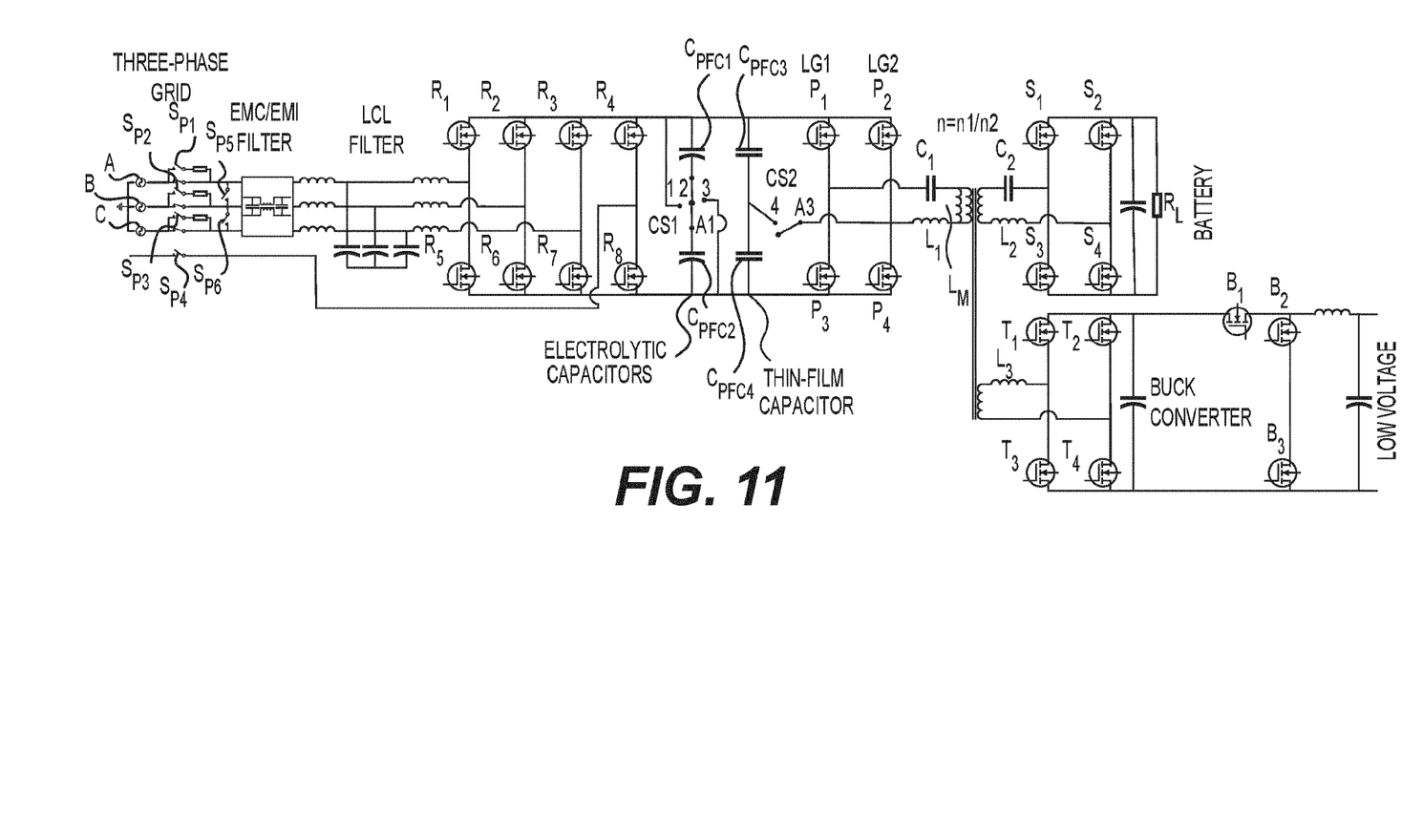
FIGS. 11 & 12 show an alternative capacitor bank and capacitor switch arrangements.

The structure in FIG. 11 moves the center-tapping connection to thin film capacitors $C_{PFC3}$ & $C_{PFC4}$ to simplify the layout. It can be possible to center-tap thin-film capacitors instead of bulk electrolytic capacitors as done in the prior Figures. The thin-film capacitors $C_{PFC3}$ & $C_{PFC4}$ can be used to filter the high frequency components. In FIG. 11, two capacitor switches are used. A first capacitor switch CS1 comprises the three nodes 1-3 and two arms A1, A2 to convert between serial and parallel connections of the at least two PFC capacitors $C_{PCF1}$ & $C_{PCF2}$. The conversion between full and half-bridge operation of the PFC circuit can be had. And the PFC capacitors $C_{PCF1}$ & $C_{PCF2}$ can be electrolytic capacitors. Then, a second capacitor switch CS2 with arm A3 and node 4 can selectively connect serial thin-film capacitors $C_{PFC3}$ & $C_{PFC4}$ to the passive device. When second capacitor switch CS2 is disconnected, the passive device connects to the second switching half-bridge leg LG2.

It can be said that the switchable power factor correction circuit can optionally comprise one or more DC-link capacitor shared with the half-bridge multi-phase switching bank and the full-bridge single-phase switching bank. As an option, the at least two power factor correction capacitors $C_{PCF1}$ & $C_{PCF2}$ can comprise one or more pair of electrolytic capacitors divided by the capacitor switch CS1. As yet another option, the switchable power factor correction circuit can further comprise one or more pair of thin-film capacitors as PFC capacitors $C_{PCF3}$ & $C_{PCF4}$ connected with the full-bridge single-phase switching bank.

It can be said that the switchable power factor correction circuit comprises one or more pair of thin-film capacitors (PFC capacitors $C_{PFC3}$ & $C_{PFC4}$) connected with the full-bridge single-phase switching bank, wherein the at least two power factor correction capacitors $C_{PFC1}$ & $C_{PFC2}$ comprise one or more pair of electrolytic capacitors divided by the capacitor switch CS1. The PFC circuit can further comprise a primary-side passive power transfer device comprising at least one inductor, the primary-side passive power transfer device connected on a first side to the first switching half-bridge leg LG1 and connected on a second side to the second switching half bridge leg LG2 and a half-bridge switch CS2 for connecting to a connection between the one or more pair of thin-film capacitors.

Figure 12:
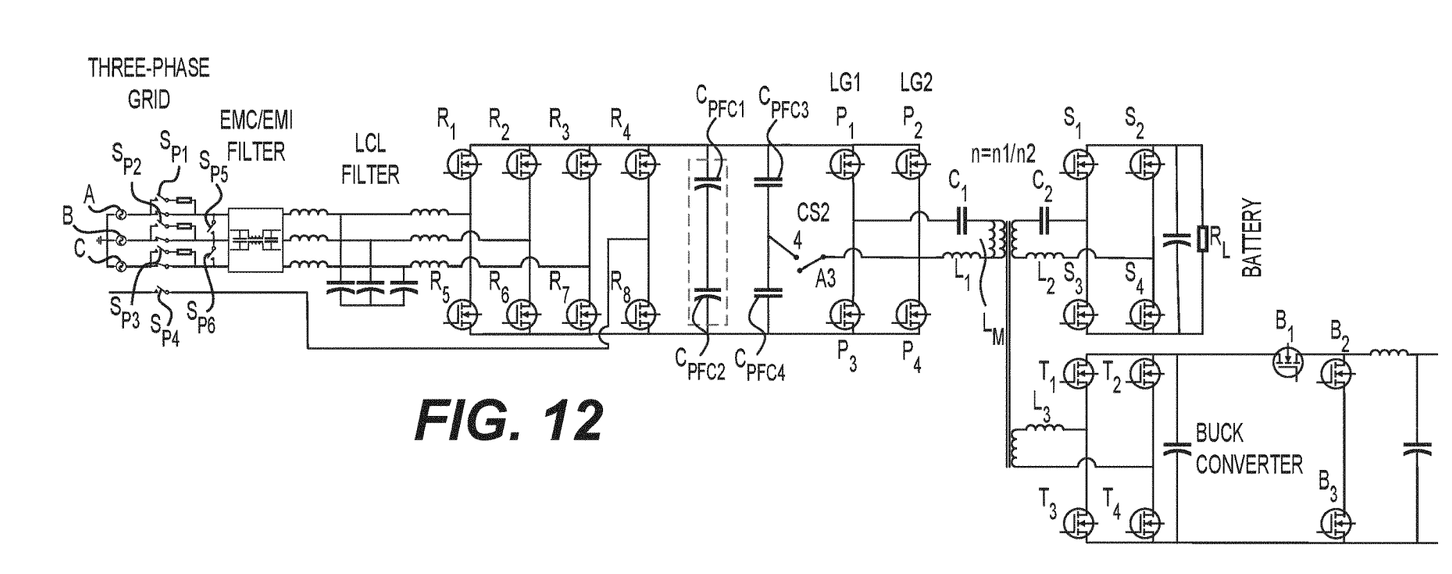
Figure 12A:
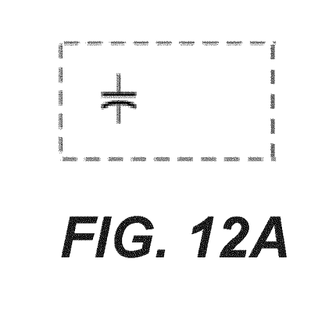
FIGS. 12A & 12B show alternative capacitor bank arrangements for the dashed line box of FIG. 12.
Figure 12B:
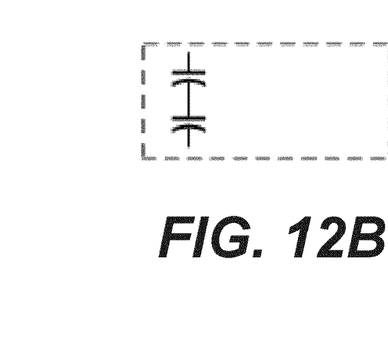

The structure in FIG. 12 eliminates the need for a DC-link capacitor relay. In this case the required amount of capacitance must be designed such that it filters the low frequency component and its voltage rating must be equal to the full DC-link voltage. To meet the voltage rating, one capacitor can be used or multiple capacitors can be added in series with each capacitor voltage rating equal to Vdc/n, where n is the total number of capacitors connected in series. This is exemplified by the exchangeable dashed-line box in FIG. 12, where the options of FIGS. 12A & 12B represent the ability to have one or more capacitors. In the example of FIG. 12B, each PFC capacitor can be rated for one half of the DC-link voltage.

It can be possible in FIG. 12 to eliminate the need for a relay (capacitor switch CS1) by increasing the value of the DC-link capacitor formed by a pair of electrolytic capacitors for the PFC capacitors $C_{PCF1}$ & $C_{PCF2}$ or to use the options of FIGS. 12a & 12B. Then, a more simple capacitor switch CS2, the second capacitor switch CS2, can be used with the thin film PFC capacitors $C_{PCF3}$ & $C_{PCF4}$.

While separate examples have been given, it is possible to combine the several examples together. For one example, it is possible to combine the center-tapping connection teachings of FIG. 12 with the previously mentioned zero vector retaining connections, bidirectional or three quadrant switches described earlier. Also, minimal switches have been illustrated, and it is possible to add additional switches to connect to load or battery sides.

While an example of electric vehicles has been provided, other transportation machines and battery-powered devices can benefit from the teachings herein.

Other implementations will be apparent to those skilled in the art from consideration of the specification and practice of the examples disclosed herein.

What is claimed is:

1. A switchable bidirectional power converter, comprising:
    a multi-phase grid connection to a half-bridge multi-phase switching bank, the half-bridge multi-phase switching bank comprising a first switching half-bridge leg;
    a single-phase grid connection to a full-bridge single-phase switching bank, wherein the half-bridge multi-phase switching bank is interleaved with the full-bridge single-phase switching bank, and wherein the full-bridge single-phase switching bank comprises the first switching half-bridge leg and a second switching half-bridge leg; and
    a capacitor switch configured to switch at least two power factor correction capacitors between:
        a parallel connection of the at least two power factor correction capacitors; and
        a serial configuration of the at least two power factor correction capacitors, the serial configuration having a center tapping connection to the second switching half-bridge leg.

2. The switchable bidirectional power converter of claim 1, further comprising a primary-side transformer comprising a winding connected with a capacitor and an inductor, the primary-side transformer connected on a first side to the first switching half-bridge leg and connected on a second side to the capacitor switch and the second switching half-bridge leg.

3. The switchable bidirectional power converter of claim 2, wherein the winding of the primary-side transformer is a multi-tap winding.

4. The switchable bidirectional power converter of claim 2, further comprising a bidirectional switch on the second side connected between the capacitor switch and the connection to the second switching half-bridge leg.

5. The switchable bidirectional power converter of claim 2, further comprising a three-quadrant switch on the second side connected between the capacitor switch and the connection to the second switching half-bridge leg.

6. The switchable bidirectional power converter of claim 1, further comprising a primary-side passive power transfer device comprising at least one inductor, the primary-side passive power transfer device connected on a first side to the first switching half-bridge leg and connected on a second side to the capacitor switch and the second switching half-bridge leg.

7. The switchable bidirectional power converter of claim 6, further comprising a bidirectional switch on the second side connected between the capacitor switch and the connection to the second switching half-bridge leg.

8. The switchable bidirectional power converter of claim 7, configured to disconnect a neutral line of the multi-phase grid connection while both the first switching half-bridge leg and the second switching half-bridge leg are used to generate a zero vector.

9. The switchable bidirectional power converter of claim 7, wherein the second switching half-bridge leg is configured to switchably connect to the half-bridge multi-phase switching bank.

10. The switchable bidirectional power converter of claim 6, further comprising a three-quadrant switch on the second side connected between the capacitor switch and the connection to the second switching half-bridge leg.

11. The switchable bidirectional power converter of claim 1, further comprising one or more DC-link capacitors shared with the half-bridge multi-phase switching bank and the full-bridge single-phase switching bank.

12. The switchable bidirectional power converter of claim 1, wherein the at least two power factor correction capacitors comprise one or more pair of electrolytic capacitors divided by the capacitor switch.

13. The switchable bidirectional power converter of claim 12, further comprising one or more pair of thin-film capacitors connected with the full-bridge single-phase switching bank.

14. The switchable bidirectional power converter of claim 1, further comprising:
one or more pair of thin-film capacitors connected with the full-bridge single-phase switching bank, wherein the at least two power factor correction capacitors comprise one or more pair of electrolytic capacitors divided by the capacitor switch, and
a primary-side passive power transfer device comprising at least one inductor, the primary-side passive power transfer device connected on a first side to the first switching half-bridge leg and connected on a second side to the second switching half-bridge leg and a half-bridge switch for connecting to a connection between the one or more pair of thin-film capacitors.

15. The switchable bidirectional power converter of claim 1, wherein the half-bridge multi-phase switching bank comprises metal-oxide-semiconductor field-effect transistors ("MOSFETS") for switching.

16. The switchable bidirectional power converter of claim 1, wherein the second switching half-bridge leg is configured to switchably connect to the half-bridge multi-phase switching bank via metal-oxide-semiconductor field-effect transistors ("MOSFETS").

17. A bidirectional on-board charger comprising:
a switchable bidirectional power converter comprising:
a multi-phase grid connection to a half-bridge multi-phase switching bank, the half-bridge multi-phase switching bank comprising a first switching half-bridge leg;
a single-phase grid connection to a full-bridge single-phase switching bank, wherein the half-bridge multi-phase switching bank is interleaved with the full-bridge single-phase switching bank, and wherein the full-bridge single-phase switching bank comprises the first switching half-bridge leg and a second switching half-bridge leg; and
a capacitor switch configured to switch at least two power factor correction capacitors between:
a parallel connection of the at least two power factor correction capacitors; and
a serial configuration of the at least two power factor correction capacitors, the serial configuration having a center tapping connection to the second switching half-bridge leg.

18. The bidirectional on-board charger of claim 17, further comprising a first battery connection to the switchable bidirectional power converter and a second battery connection to the switchable bidirectional power converter, wherein the first battery connection is rated for a voltage twice to one or more factor of ten larger than a rating of the second battery connection.

* * * * *